United States Patent [19]

Kato et al.

[11] Patent Number: 5,226,035
[45] Date of Patent: Jul. 6, 1993

[54] DISK CARTRIDGE HAVING A SHUTTER WITH AN ANTISTATIC COATING

[75] Inventors: Shinichiro Kato; Shuichi Kikuchi, both of Miyagi; Toshiro Kobayashi, Kanagawa, all of Japan

[73] Assignee: Sony Corporation, Tokyo, Japan

[21] Appl. No.: 684,033

[22] Filed: Apr. 11, 1991

[30] Foreign Application Priority Data

Apr. 13, 1990 [JP] Japan .............................. 2-039811[U]
Nov. 22, 1990 [JP] Japan .............................. 2-122834[U]

[51] Int. Cl.⁵ ...................... G11B 23/033; G11B 23/02
[52] U.S. Cl. .................................... 369/291; 360/133; 206/444
[58] Field of Search ............... 369/291; 360/133, 132; 206/309, 444

[56] References Cited

U.S. PATENT DOCUMENTS

| | | | |
|---|---|---|---|
| 4,511,489 | 4/1985 | Requejo et al. | 252/172 |
| 4,680,662 | 7/1987 | Fukushima et al. | 360/133 |
| 4,722,017 | 1/1988 | Vannet et al. | 360/133 |
| 4,802,047 | 1/1989 | Tanaka et al. | 369/291 X |
| 4,901,180 | 2/1990 | Oishi | 360/133 |
| 4,908,726 | 3/1990 | Kato | 369/291 X |
| 4,977,475 | 12/1990 | Shiba et al. | 360/133 |
| 5,020,048 | 5/1991 | Arai et al. | 369/291 |
| 5,021,913 | 6/1991 | Overland et al. | 369/291 X |
| 5,161,080 | 11/1992 | Funayama et al. | 360/133 |

FOREIGN PATENT DOCUMENTS 1-286190 12/1988 Japan .

Primary Examiner—A. J. Heinz
Assistant Examiner—Joseph A. Rhoa
Attorney, Agent, or Firm—Limbach & Limbach

[57] ABSTRACT

A disk cartridge which accommodates a disk-like recording medium therein and has head insertion openings, and a shutter which is made of sheet metal, formed substantially into letter U in section, and slidably secured to an outside of the cartridge to open and close the head insertion openings with a pair of covers provided in the shutter, at least one outer surface of the two covers is at least partly covered with a coating (13) to prevent the shutter from being flawed. The coating (13) includes an anti-static material.

9 Claims, 8 Drawing Sheets

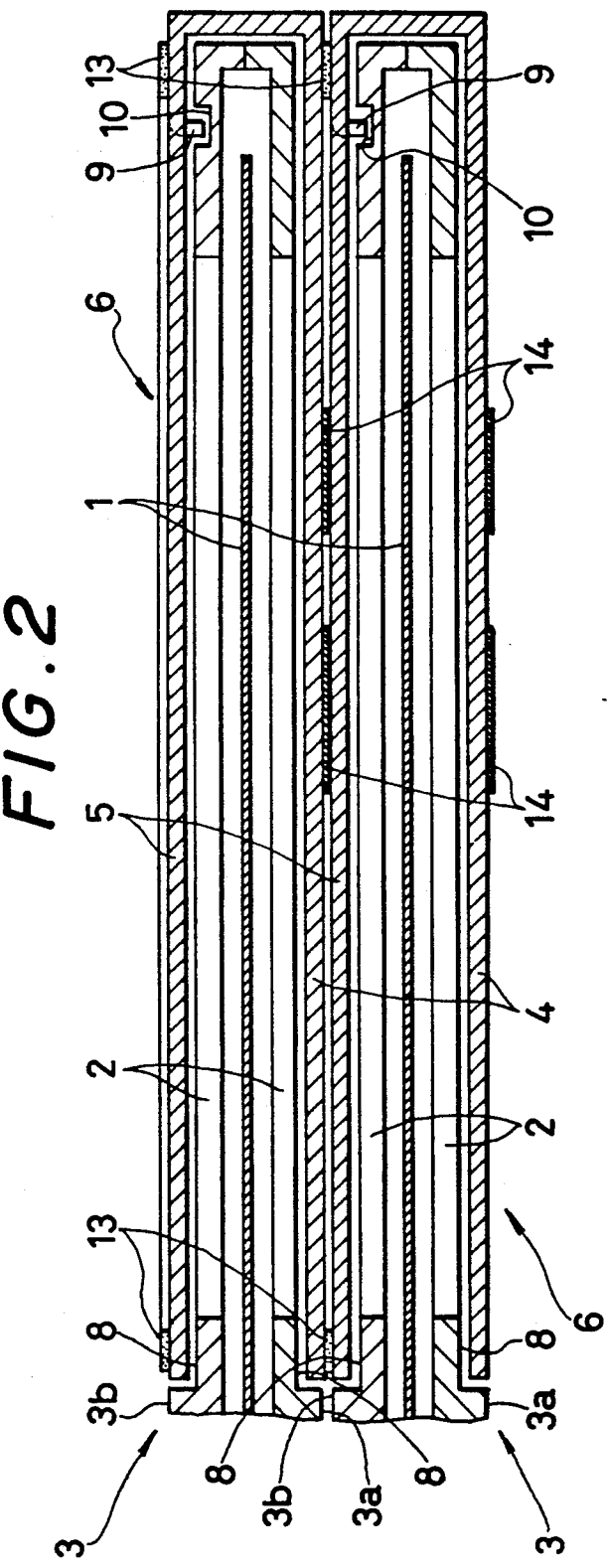
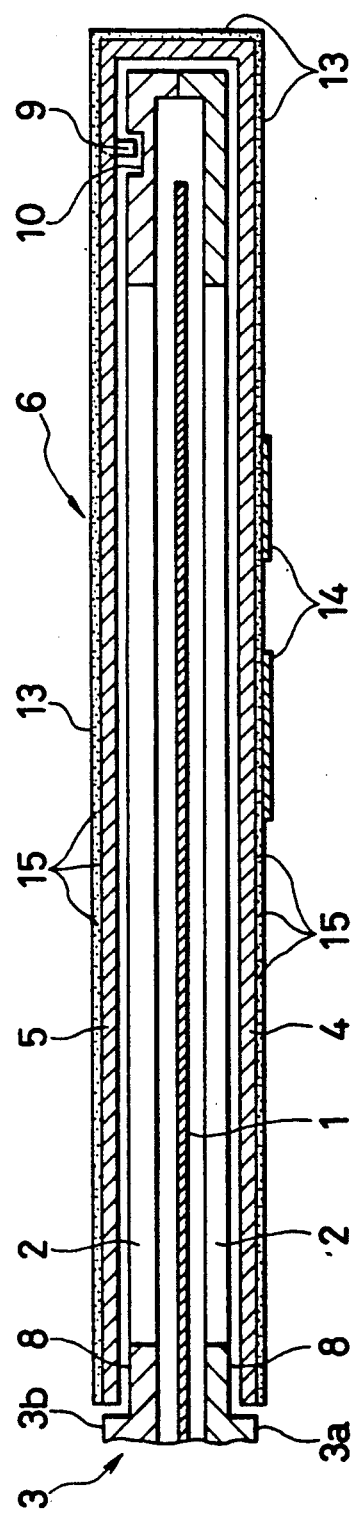

DISK CARTRIDGE HAVING A SHUTTER WITH AN ANTISTATIC COATING

BACKGROUND OF THE INVENTION

1. Field of the Invention

This invention relates generally to a disk cartridge in which a recording medium, such as a magnetic disk, an optical disk or the like is accommodated, and more particularly is directed to means for preventing a shutter thereof from being flawed.

2. Description of the Related Art

As shown in FIGS. 12 to 13, disclosed in Japanese Utility Model Registration Publication No. 60-6938 is a disk cartridge, which comprises a cartridge 3 which accommodates a disk-like recording medium 1 therein and has a pair of upper and lower head insertion openings 2, and a shutter 6 which is made of sheet metal, formed substantially into letter U in section by press working, and slidable in a direction of arrows a, b on the outside of the cartridge 3 to open and close the head insertion openings 2 with a pair of covers 4, 5 provided in the shutter 6.

The covers 4, 5 of the shutter 6 have respective openings 7 near to the leading ends thereof at the time of the shutter 6 being moved in the direction of arrow a, and are fitted in respective depressions 8 provided in the upper surface 3a and the lower surface 3b of the cartridge 3. Further, a plurality of projections 9, which are formed by press working so as to be projected vertically upwards from the lower cover 5 of the shutter 6, are slidably fitted into a groove 10, which is provided in the lower surface 3b of the cartridge 3. It is noted that the central plate 1a of the disk-like recording medium 1 is loosely fitted in a turntable insertion opening 11, which is provided substantially at the center of the lower side 3b of the cartridge 3.

When the disk cartridge is out of use, the shutter 6 is moved in the direction of the arrow a toward a closed position indicated in solid lines in FIGS. 12 and 13 by the force of a spring (not shown), which is arranged within the cartridge 3, so that the pair of upper and lower head insertion openings 2 are closed by the pair of covers 4, 5, respectively. Thus, the cartridge 3 is prevented from dust being entered therein through the head insertion openings 2.

When the disk cartridge is inserted into a recording and/or reproducing apparatus, the shutter 6 is slid in the direction of arrow b toward an open position indicated in chain-dotted lines in FIGS. 12 and 13, and as a result the pair of openings 7 of the shutter 6 coincide with the pair of head insertion openings 2. Thus, the head insertion openings are opened. At the same time, a turntable (not shown) of the apparatus is inserted into the cartridge 3 through the turntable insertion opening 11 thereof, and connected with the central plate 1a of the recording medium 1 to be able to drive the recording medium 1. A pair of upper and lower recording or reproducing heads (not shown) are also inserted into the cartridge 3 through the pair of head insertion openings 2 to be able to record information on or reproduce information from the recording medium 1.

The shutter 6 is made of stainless steel of 0.15–0.3 mm in thickness, and in order to give a superior impression upon the disk cartridge, the overall surface of the shutter 6 is generally ornamented with "hair lines" comprising grooves of 100–300 $\mu$m in width and 1.5–3 $\mu$m in depth. The heights of the hair lines are however very small, so that the hair lines are apt to be collapsed and damaged during manufacture of the shutter 6, because the shutters 6 are rubbed against each other, as shown in FIG. 14, strongly pressed against a conveyor in such duration.

Moreover, to prevent the disk cartridge from lowering its commercial value due to damage to the shutter 6, the shutter 6 must be treated very carefully and inspections of the shutter 6 must be made minutely. Thus, the yield of its manufacture decreases and its production rate becomes bad. In addition, if the shutter 6 is touched directly with bare fingers, the hair lines are soiled with the finger marks or the like and not easily cleaned. Thus, it becomes difficult to give a very good appearance to the disk cartridge.

OBJECTS AND SUMMARY OF THE INVENTION

Accordingly, it is an object of the present invention to provide a disk cartridge which avoids the previously described disadvantages of the prior art.

Another object of the invention is to provide a disk cartridge in which during manufacturing the shutter thereof, hair lines provided on the outer surface of the shutter are not directly rubbed and damaged due to existence of a coating which covers the shutter at least in part. Thus, even when the shutters are rubbed against each other, flaws initiated in the shutter are much decreased, the yield of manufacturing the shutter is improved, the production rate of the shutter is also improved because of omitting or simplifying an inspection process, and the appearance of the shutter is maintained as it is for a long time.

A further object of the invention is to provide a disk cartridge in which hair lines provided on the outer surface of the shutter thereof are covered with a coating so that the outer surface may not be soiled with finger marks or the like, and if soiled, may be easily removed.

Still a further object of the invention is to provide a disk cartridge in which an antistatic agent is added to a coating that covers a shutter thereof so that the surface of the shutter is not soiled with dust and the like.

In accordance with an aspect of this invention, in a disk cartridge comprising a cartridge which accommodates a disk-like recording medium therein and has head insertion openings, and a shutter which is made of sheet metal, formed substantially into letter U in section, and slidably secured to an outside of the cartridge to open and close the head insertion openings with a pair of covers provided in the shutter, at least one outer surface of the two covers is at least partly covered with a coating to prevent the shutter from being flawed.

In a preferred embodiment of this invention, an antistatic treatment is given to the coating.

The above, and other objects, features and advantages of this invention, will be apparent from the following detailed description of illustrative embodiments thereof to be read in connection with the accompanying drawings, wherein like reference numerals identify the same or corresponding parts in the several views.

BRIEF DESCRIPTION OF THE DRAWINGS

FIG. 2 is an enlarged sectional view of two of the disk cartridge of FIG. 1, one of which is overlaid upon the other;

FIG. 10 is an enlarged sectional view of the shutter of FIG. 8;

DETAILED DESCRIPTION OF PREFERRED EMBODIMENTS

Figure 1:
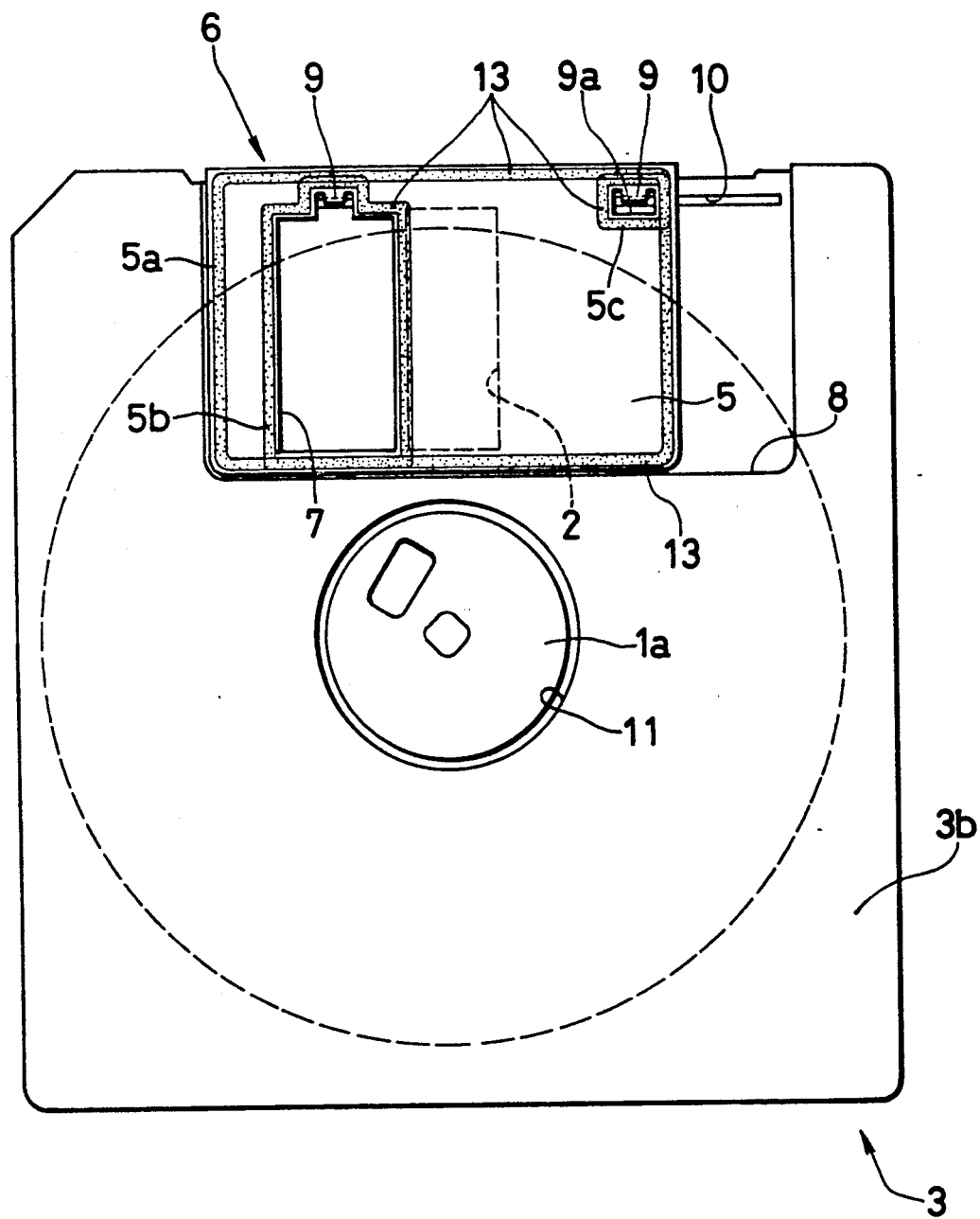
FIG. 1 is a rear view of a disk cartridge according to one embodiment of this invention.
Figure 3:
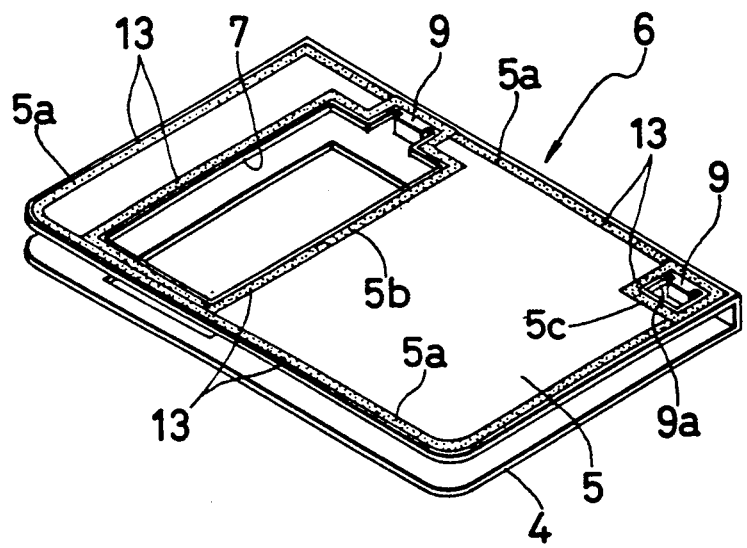
FIG. 3 is a perspective rear view of the shutter shown in FIG. 2.
Figure 4:
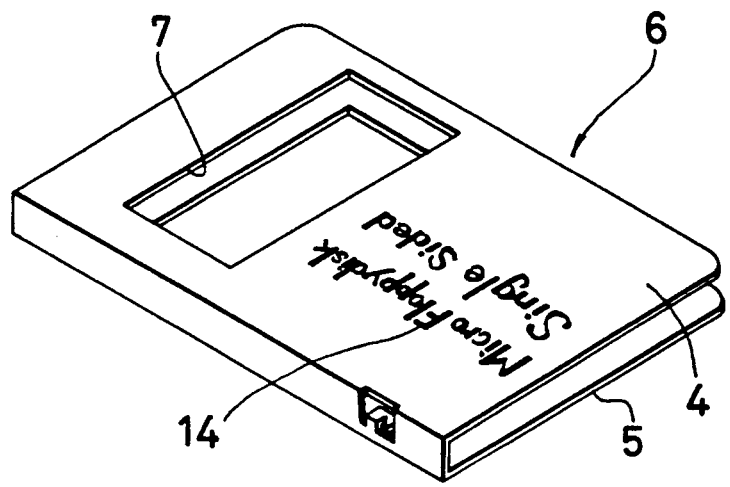
FIG. 4 is a perspective front view of the shutter of FIG. 3.
Figure 5:
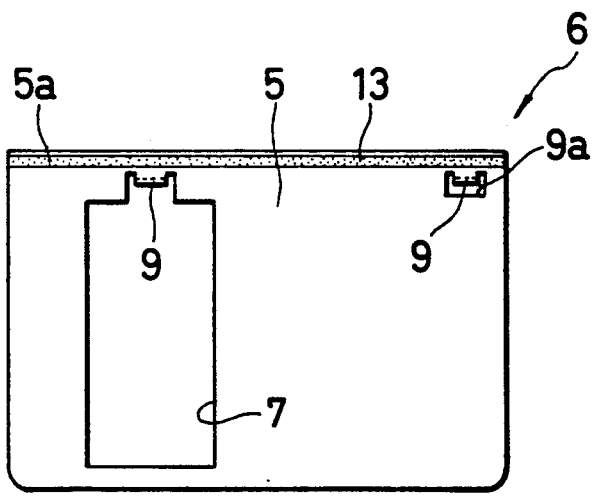
FIGS. 5 to 7 are rear views of respective shutters obtained from modifying the shutter of FIG. 3.
Figure 6:
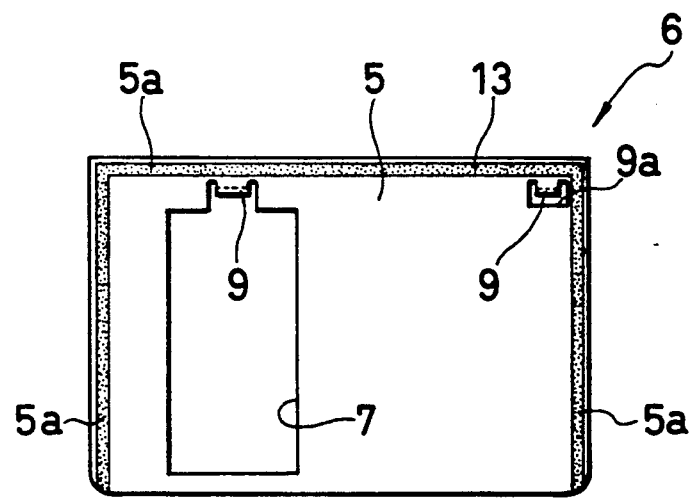

A first embodiment of the present invention will be described in regard to FIGS. 1–7, in which a shutter 6 made of sheet metal, such as stainless steel or the like, has an upper cover 4 and a lower cover 5, and the lower cover 5 is covered with a coating 13 for preventing the cover 5 from flaws. The coating 13 is formed by spreading a wear-resisting and transparent or colored ink or the like on the surface of the cover 5 by means of a silk-screen printing or a thermal transfer process, in which an ink spreaded on a film is transferred to the cover 5 at a high temperature.

At that time, it will be sufficient if the thickness of the coating 13 is substantially within a range of 4–20 μm. The coating 13 in 1–2 mm width is made on the entire outer edge 5a of the lower cover 5, the entire edge 5b of an opening 7, and the entire edge 5c of a hole 9a, which is formed at a time when a projection 9 is provided by press working. Further, letters 14 of 10–20 μm thickness and denoting a name of maker, article or the like are printed on the surface of the upper cover 4 by means of spreading a wear-resisting colored ink or the like on the surface by a silk-screen printing. It is noted that the ink spreading process may be performed on a rolled sheet metal before the shutter 6 is blanked therefrom, or on each shutter 6 after press working.

Thus, if the covers 4, 5 of the two shutters 6 are rubbed against each other in the course of their manufacture as shown in FIG. 2, or strongly pressed against conveyers or the like included in production facilities, the face-toface covers 4, 5 are spaced apart a distance which corresponds to the thickness of the coating 13 or letters 14, so that the hair lines provided in the surfaces of the shutters 4, 5 are prevented from being damaged.

Figure 7:
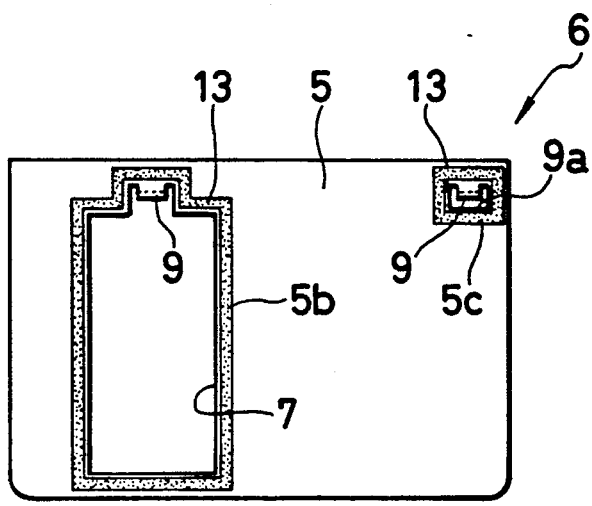

In the first embodiment described above, the coating 13 was formed only on the lower cover 5 of the shutter 6, but it may be possible to form the same coating on the upper cover 4, too. Further, it may be possible for the coating to be applied to only one or three of the four edges of the shutter 6 (FIGS. 5 to 6), or to only the entire edges 5b, 5c of the opening 7 and the hole 9a (FIG. 7).

Figure 8:
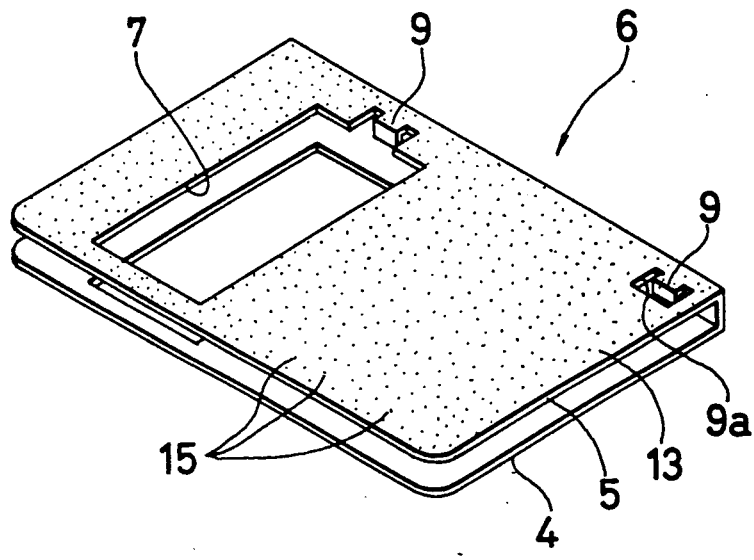
FIG. 8 is a perspective rear view of a shutter of the disk cartridge of FIG. 1, according to another embodiment of this invention.
Figure 9:
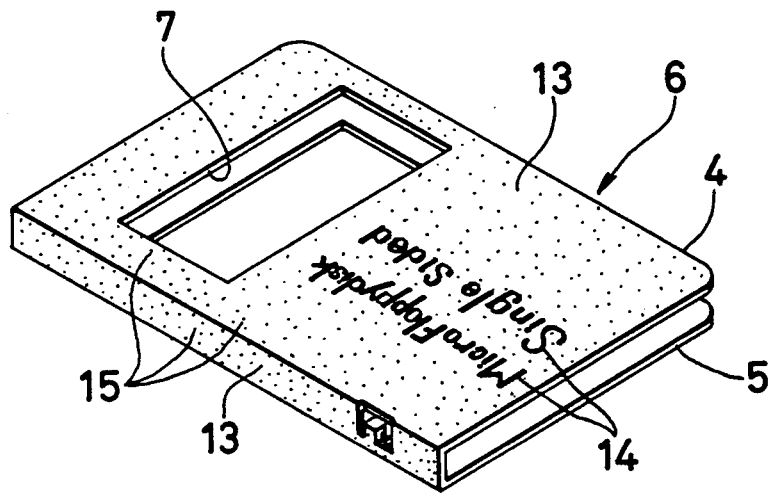
FIG. 9 is a perspective front view of the shutter of FIG. 8.

In a second embodiment shown in FIGS. 8 to 10, a coating 13 is applied to the whole surface of the shutter 6, and in the coating 19, there is included an antistatic agent. Used as the coating 13 is a transparent, wear-resisting ink, for example, of polyester resin, acrylic resin, polyester-melamine plastic, fluoroplastic or the like, and an antistatic agent 15, such as the anionic, cationic, nonionic or ampholytic one, or polar high-polymeric substance is added generally in amount of 1–10% by weight. Such ink is spreaded on the whole surface of the shutter 6 by means of the silk-screen printing or thermal transfer process so as to form the coating 13. It is noted that the letters 14 denoting the name of maker and others are formed on the coating 13.

The hair lines formed on the shutter 6 is certainly protected by the coating 13, but if the antistatic agent 15 is not added, static electricity is much charged on the coating 13 due to nonconductivity of the ink. For example, when the shutters 6 are rubbed with each other, the shutter 6 is apt to be covered with dust, and if the recording medium 1 in the cartridge 3 should be soiled with such dust, serious drawbacks, such as incomplete transmission of signals, impossibleness of recording or the like might be encountered. In the second embodiment, the antistatic agent 15 is added to the ink, so that the shutter 6 is scarcely soiled with dust.

A antistatic effect is examined upon a coating A, which is formed on the surface of the shutter 6 by spreading polyester resin of 4–5 μm thickness and includes anionic surface-active agent 15 of 3% by weight. An electrostatic potential of 8.5 kV is impressed, through a corona discharge, on the coating A and another coating B, which is formed by spreading only the polyester resin in order to compare it with the coating A.

Figure 11:
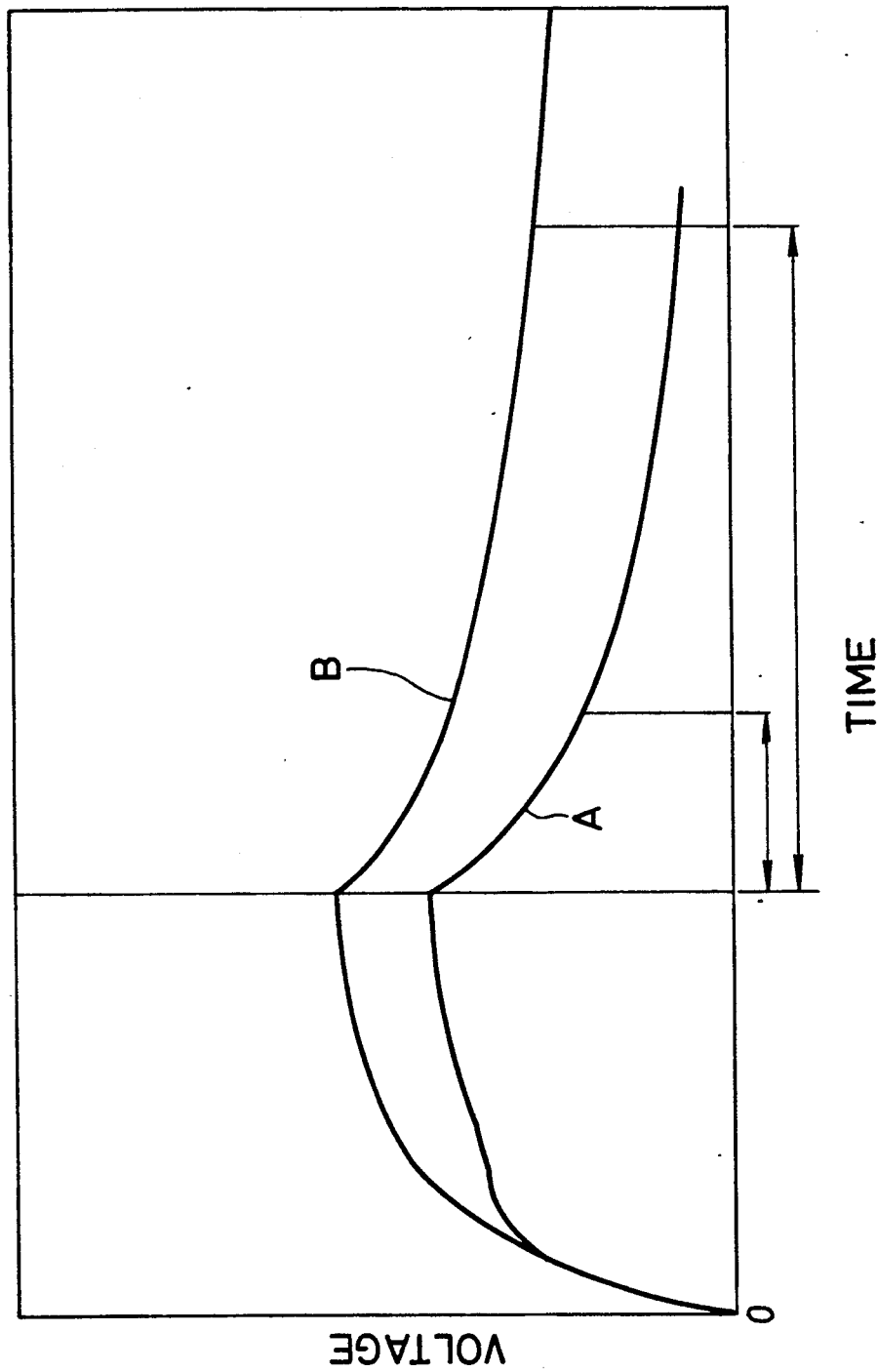
FIG. 11 is a graphical representation of a time-discharge voltage relationship present in a coating which covers the outer surface of the shutter.
Figure 12:
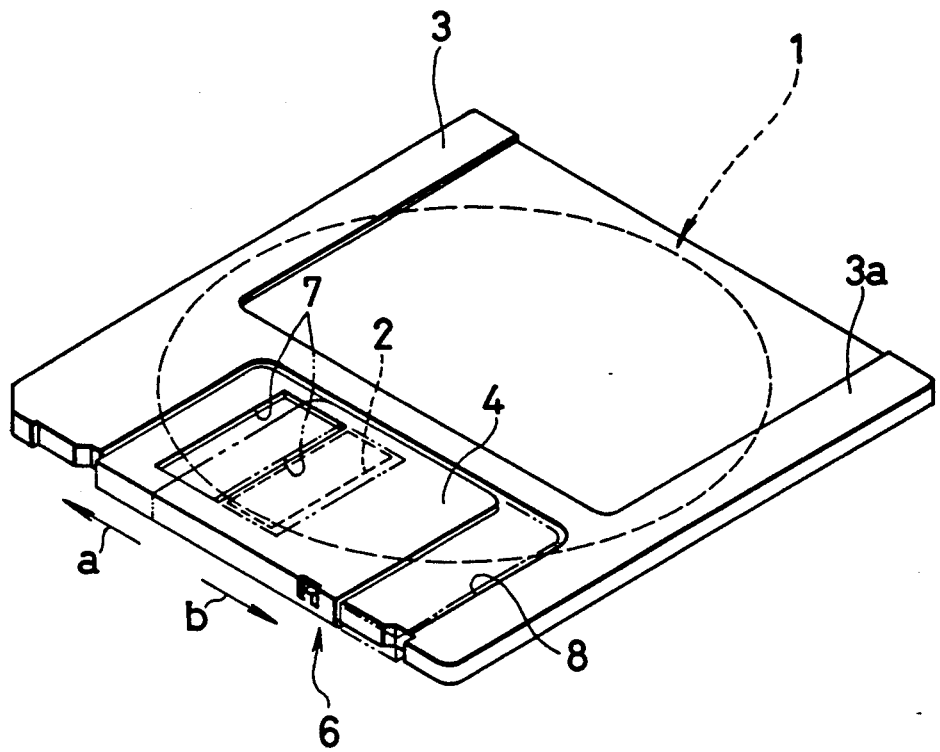
FIG. 12 is a perspective front view of a previously proposed disk cartridge.
Figure 13:
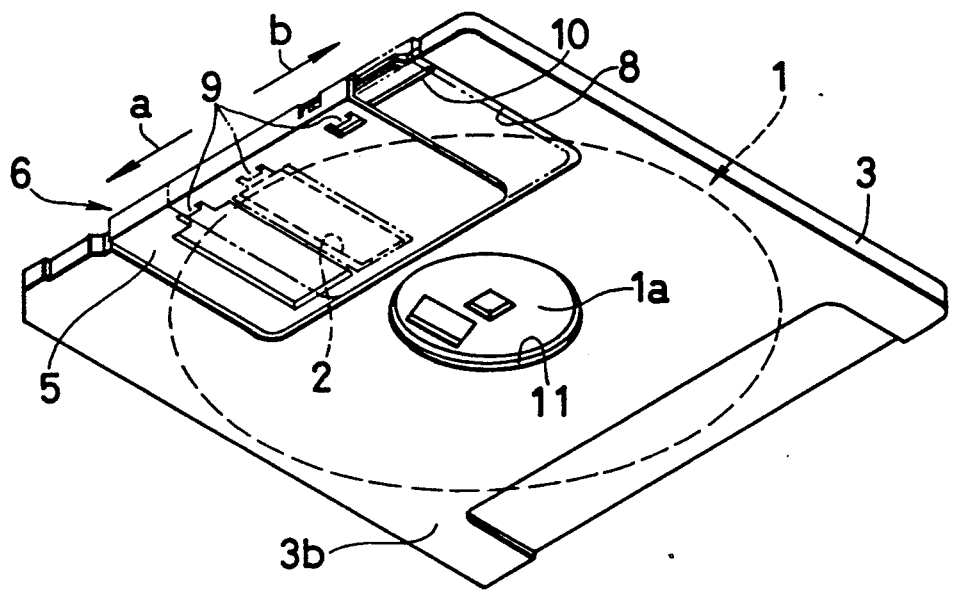
FIG. 13 is a perspective rear view of the disk cartridge of FIG. 12.
Figure 14:
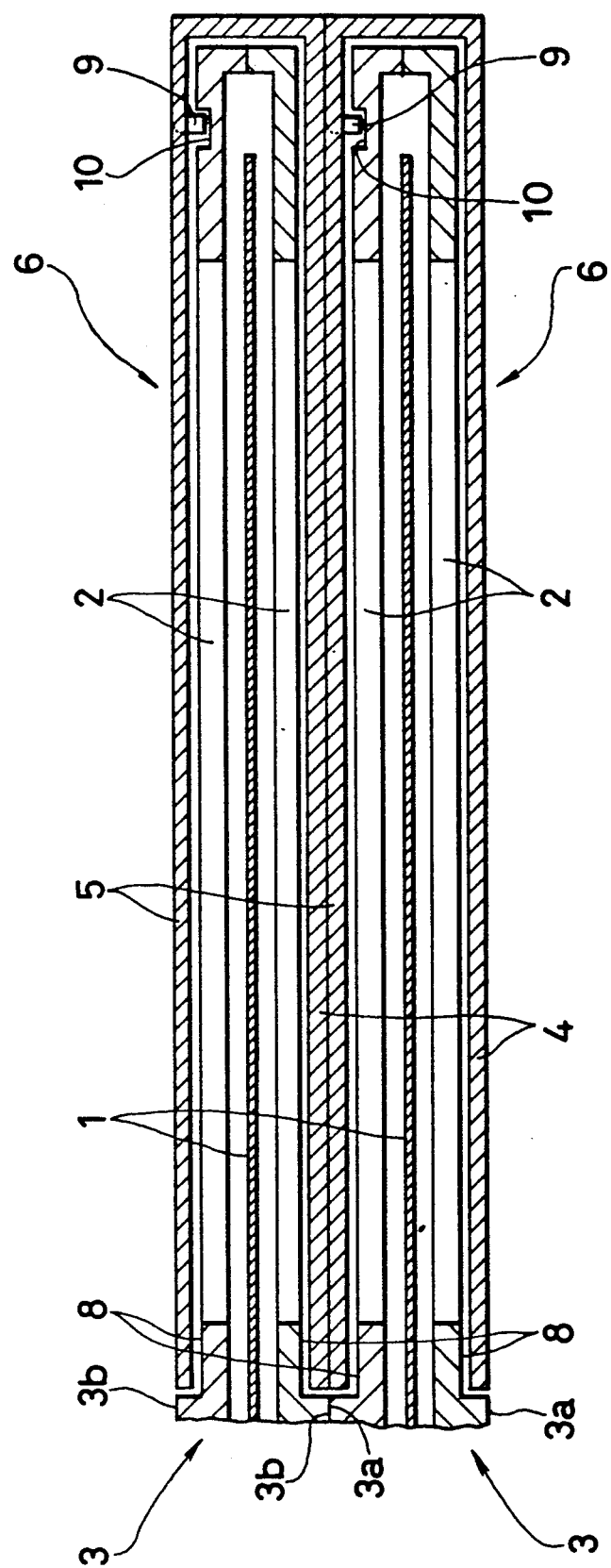
FIG. 14 is an enlarged sectional view of two of the disk cartridges of FIG. 12, one of which is overlaid upon the other.

As shown in FIG. 11, an initially gained voltage of the coating A corresponds to 75% of that of the coating B, and a time so far that the voltage of the coating A decreases to one half of its initial voltage corresponds substantially to one fourth of that of the coating B. Thus, it is quite apparent that the antistatic agent produces a good effect.

Carbon may be added to the ink as the antistatic agent, and when the carbon is added, the coating is not only antistatic but also excellent in color. Powder of less diameter than 0.2 μm, containing electrically-conductive powder of tin oxide, antimony or the like and tin-oxide powder for the rest also may be used as the antistatic agent, and in that event, the coating is antistatic without being much damaged in color. The antistatic effect may be also obtained by spreading a nitric and nonionic antistatic agent, such as futty ester and polyoxyethylene-alkylamine, on the surface of the coating 13. At that time, it is required that more than 80% of the whole surface of the shutter 6 or the whole surfaces of the pair of covers 4 and 5 are covered with the antistatic agent in order to gain the antistatic effect.

When the whole surface of the shutter 6 is covered with the coating 13, the surface of the shutter 6, being roughed with the hair lines, is smoothened. According to an roughness examination, the surface roughness of the coating 13 made of acrylic resin of 5 μm thickness is 0.6 μm (PZ), whereas the surface roughness of the cover 4, 5 without any coating is 1.42 μm (PZ).

Moreover, at the time when the whole surface of the shutter 6 is covered with the coating 13, the surface of the shutter 6 is not easily soiled with fingers, and if soiled, is easily made clean only by simply wiping it.

Having described illustrative embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims. It is noted that this invention can be applied to disk cartridges of various types, in which various kinds of disk-like recording mediums are accommodated, respectively.

What is claimed is:

1. A disk cartridge comprising a cartridge which accommodates a disk-like recording medium therein and has head insertion openings, and a shutter which is made of sheet metal, formed substantially into letter U in section, and slidably secured to an outside of the cartridge to open and close the head insertion openings with a pair of covers provided with the shutter, wherein at least one outer surface of the two covers is at least party covered with a coating having an antistatic agent to prevent the shutter from being flawed.

2. A disk cartridge according to claim 1 wherein the coating is a transparent, wear-resisting ink selected from the group consisting of polyester resin, acrylic resin, polyester-melamine plastic, fluoroplastic, and combinations thereof.

3. A disk cartridge according to claim 2 wherein the coating further comprises an anionic antistatic agent.

4. A disk cartridge according to claim 2 wherein the coating further comprises a cationic antistatic agent.

5. A disk cartridge according to claim 2 wherein the coating further comprises an ampholytic antistatic agent.

6. A disk cartridge according to claim 2 wherein the coating further comprises as an antistatic agent a polar high-polymeric substance which is added to the wear-resisting coating in the amount of 1-10% by weight.

7. A disk cartridge according to claim 2 wherein the coating further comprises carbon as an antistatic agent added to the wear-resisting coating.

8. A disk cartridge according to claim 2 wherein the coating further comprises as an antistatic agent an electrically conductive powder of less than 0.2 μm in diameter selected from the group consisting of tin oxide, antimony, and combinations thereof.

9. A disk cartridge according to claim 2 wherein the coating further comprises as an antistatic agent a futty ester and polyoxyethylenealkylamine on the surface of the coating and further wherein the coating covers more than 80% of the outer surface of the shutter.

* * * * *